United States Patent
Wang Helmersson et al.

(10) Patent No.: US 9,277,510 B2
(45) Date of Patent: Mar. 1, 2016

(54) METHODS AND ARRANGEMENTS IN A COMMUNICATION NETWORK SYSTEM

(75) Inventors: Ke Wang Helmersson, Linköping (SE); Zhang Zhang, Beijing (CN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 167 days.

(21) Appl. No.: 13/501,783

(22) PCT Filed: Oct. 23, 2009

(86) PCT No.: PCT/SE2009/051209
§ 371 (c)(1),
(2), (4) Date: Apr. 13, 2012

(87) PCT Pub. No.: WO2011/049495
PCT Pub. Date: Apr. 28, 2011

(65) Prior Publication Data
US 2012/0201134 A1    Aug. 9, 2012

(51) Int. Cl.
*H04W 28/10* (2009.01)
*H04W 52/36* (2009.01)
*H04W 52/14* (2009.01)
*H04W 72/12* (2009.01)

(52) U.S. Cl.
CPC .......... *H04W 52/365* (2013.01); *H04W 52/146* (2013.01); *H04W 52/367* (2013.01); *H04W 72/1252* (2013.01); *H04W 72/1289* (2013.01)

(58) Field of Classification Search
CPC ............ H04W 52/365; H04W 52/367; H04W 72/1242; H04W 52/34; H04W 28/10; H04W 4/00; H04W 52/146; H04W 52/325; H04L 12/26
USPC ................ 370/230, 328, 329, 252, 458, 332; 375/259, 260, 346; 455/522, 452.2, 455/453
See application file for complete search history.

(56) References Cited

U.S. PATENT DOCUMENTS

| | | | |
|---|---|---|---|
| 7,146,175 B2 * | 12/2006 | Rune et al. | 455/453 |
| 2005/0281219 A1 | 12/2005 | Kim et al. | |
| 2006/0215608 A1 | 9/2006 | Lee et al. | |

(Continued)

FOREIGN PATENT DOCUMENTS

| EP | 1672941 A1 | 6/2006 |
|---|---|---|
| EP | 1833203 A1 | 9/2007 |

(Continued)

OTHER PUBLICATIONS

3RD Generation Partnership Project. "EUL Scheduling: Signalling Support." 3GPP TSG-RAN Wg1 Meeting #38bis, Tdoc R1-041084, Seoul, Korea, Sep. 20-24, 2004.

*Primary Examiner* — Charles C Jiang
*Assistant Examiner* — Wali Butt
(74) *Attorney, Agent, or Firm* — Murphy, Bilak & Homiller, PLLC

(57) ABSTRACT

The present invention relates to methods and arrangements of controlling an uplink data rate between a user equipment and a communication network node, which are communicating with each other on uplink and downlink data channels over a radio interface. A scheduler is arranged to distribute available scheduling headroom, provided by an uplink load control unit, between user equipments which are to be scheduled. A scheduling grant signalling is sent from the communication network node to the user equipment, based on which the user equipment is able to select a transport format combination (E-TFC).

8 Claims, 7 Drawing Sheets

(56) References Cited

U.S. PATENT DOCUMENTS

| | | | |
|---|---|---|---|
| 2008/0084848 A1* | 4/2008 | Jard et al. | 370/332 |
| 2008/0198802 A1* | 8/2008 | Zhang et al. | 370/329 |
| 2009/0258666 A1* | 10/2009 | Pelletier et al. | 455/522 |
| 2010/0067389 A1* | 3/2010 | Wang Helmersson et al. | 370/252 |
| 2010/0091730 A1* | 4/2010 | Jang et al. | 370/329 |

FOREIGN PATENT DOCUMENTS

| | | | | |
|---|---|---|---|---|
| EP | 1912345 A1 | 4/2008 | | |
| EP | 2034649 A1 | 3/2009 | | |
| WO | WO 2008057016 A1 * | 5/2008 | ............ | H04W 52/36 |
| WO | 2009/022812 A2 | 2/2009 | | |
| WO | 2009117601 A1 | 9/2009 | | |

* cited by examiner

METHODS AND ARRANGEMENTS IN A COMMUNICATION NETWORK SYSTEM

TECHNICAL FIELD

The present invention relates to methods and arrangements in a communication network system, in particular to an arrangement allowing for controlling an uplink data rate as well as a method for such control.

BACKGROUND

Load control and scheduling are two key functions to manage the radio resources in wideband code division multiple access (WCDMA) systems. The scheduler distributes the radio resource among user equipments (UEs) while the load control estimates the available scheduling headroom that the scheduler may use. This is illustrated in FIG. 2, which shows the prior art procedure of scheduling. The uplink load control provides the Enhanced uplink (EUL) scheduler with the total scheduling headroom for a cell. The scheduler selects the user equipment(s) to be scheduled and distributes the available scheduling headroom among the selected user equipment(s) (step 20). The scheduler then maps the scheduling headroom to power offset or enhanced transport format combination (E-TFC) for each UE to be scheduled (step 21). The scheduler then signals the scheduling grants in terms of maximum E-TFC or power offset to the UEs via a scheduling grant signalling (step 22). The UEs select a suitable E-TFC below the granted E-TFC (step 23). The radio base station (RBS) measures the cell rise over thermal (ROT) and carrier-to-interference ratio (CIR) and inputs the measurements to the uplink load control, which adjusts the maximum scheduling headroom based on the received measurements (step 24) and provides the scheduler with this adjusted scheduling headroom, and so on.

In the uplink, the common radio resource shared among the user terminals is the total amount of tolerable interference, which is defined as the average interference over all the antennae. A relative measure of total interference is rise over thermal (ROT), i.e. the total interference relative to thermal noise.

Load factor represents the portion of uplink interference that a certain channel of a certain user terminal generates, which is defined as the interference due to the channel of that user terminal divided by the total interference. The total load factor of different channels equals to the sum of load factors due to different channels.

The uplink load control estimates the resource utilization in terms of cell load generated by different type of traffic and channels of each cell based on measurements, such as, rise over thermal and CIR; the load control also regulates the maximum available scheduling headroom that the scheduler can use to schedule user equipments for transmitting data in the cell.

The scheduler distributes the available scheduling headroom among the user equipments which have data to transmit, either one at a time, time division multiplexing (TDM) scheme, or several at a time, code division multiplexing (CDM) scheme. The scheduler determines when a certain user equipment is allowed to transmit and at what maximum data rate. In the existing scheduling framework, two scheduling grants, absolute grants and relative grants are used to control data transmission limit of each user equipment. The data transmission limit is expressed in terms of the maximum E-TFC. The E-TFC for different data rate is formulated by power offset between the enhanced dedicated physical data channel (E-DPDCH) and dedicated physical control channel (DPCCH), as shown in equation (1):

$$\text{pwroff}_{grant\_est}^{k} = f(\text{load}_{avi}^{k}, \text{load}_{DPCCH\_est}^{k}, \text{load}_{sched\_est}^{k}) \quad (1)$$

wherein:
$\text{pwroff}_{grant\_est}^{k}$ is the (estimated) maximum power offset that can be granted for user k;
$\text{load}_{avi}^{k}$ is the available scheduling headroom for user k;
$\text{load}_{DPCCH\_est}^{k}$ is the (estimated) DPCCH load from user k; and,
$\text{load}_{sched\_est}^{k}$ is the (estimated) load from the channel(s) that are already scheduled for user k.

The scheduler signals the scheduled user equipment with the maximum E-TFC or the maximum power offset via scheduling grant. To determine the scheduling grants, the uplink load generated by each scheduled user equipment needs to be estimated.

The uplink load may be estimated based on carrier-to-interference ratio (CIR) measurements. Suppose user k has N uplink channels, the load generated by the user equipment can be calculated by equation (2):

$$Load_{i\_est}^{k} = \frac{CIR_{1\_meas}^{k} \cdot \text{pwroff}_{i\_est}^{k}}{loadpar_{1} + loadpar_{2} \cdot CIR_{1\_meas}^{k} \cdot \left(1 + \sum_{i=2}^{N} \text{pwroff}_{i\_est}^{k}\right)} \quad (2)$$

wherein:
$CIR_{1\_meas}^{k}$ is the (measured) CIR of the 1st channel from user k;
$\text{pwroff}_{i\_est}^{k}$ is the (estimated) power offset between the ith channel and the first channel of user k;
loadpar1 is the first load estimation parameter; and,
loadpar2 is the second load estimation parameter.

The load parameters are system parameters selected by the radio network controller (RNC).

In the existing solution the scheduler controls the user equipment data rate by limiting the maximum E-TFC. To estimate the maximum E-TFC for a user equipment, the load generated by each user equipment in the cell needs to be estimated. There are several problems for EUL scheduler to estimate the load in the previously known systems:
  Due to the inner-loop power control, the DPCCH power used by a user equipment may vary quite a lot from the time when the EUL scheduler estimates the load to the time when the grant is used by the user equipment;
  The load generated by the granted E-TFC can be completely different from the load that was estimated at EUL scheduler;
  Another difficulty for EUL scheduler is to take into account individual receiver type of EUL user equipments when the load of a granted E-TFC is estimated, since the impact of self-interference is not negligible.

The inaccuracy in the load estimation causes large oscillations in the actual cell load or rise over thermal; To ensure stability of the system, a large load margin is introduced to prevent the instability. However, it is difficult to configure the load margin for all different scenarios. A conservative large load margin may result in inefficiently utilization of resource while a small load margin may cause large oscillations in rise over thermal, both have negative impact on the system throughput.

The addressed problems may be mitigated by:
  Dynamically adapting the load parameters according to the temporary radio environment.

Power based load estimation (according to the original definition of load factor), where the load factor due to the ist channel of user k is estimated as:

$$Load_{i\_est}^k = \frac{pwr_{i\_meas}^k}{Itot_{meas}} \quad (3)$$

The variation in radio environment, etc. is automatically reflected in the wide band received power. This is because the uplink (inner loop) power control always tries to adjust the user equipment power so that the perceived CIR at the base station is close to the CIR target. The level of received power will however, depend on the receiver scheme, data rate and radio environment.

Introducing another inner power control loop to control the total received power. This inherently avoids oscillation in rise over thermal even with fixed load parameters.

However, for all the schemes a precondition to achieve evident performance gain (both increased throughput and decreased rise over thermal oscillation) is that system delay is small and scheduling as well as load estimation are performed sufficiently frequently (especially when with high target rise over thermal). This is because with large system delay the load may vary a lot from the time when the EUL scheduler determines the power offset (E-TFC) that can be granted to the time when the granted E-TFC is used by the user equipment. This may lead to distinct load estimation error at the time the grant is used by the user equipment, even though the load is accurately estimated at the time the EUL scheduler issues the grants. Thus, the benefits of these schemes are decreased.

On the other hand, decreasing system delay is not an easy task when signaling procedure is involved, and more frequent execution of scheduling implies higher signaling overhead, especially for the third alternative addressed above, where two power control loops are needed.

SUMMARY

Accordingly, one objective with embodiments of the present invention is to provide methods and arrangements in a communication network node of controlling an uplink data rate between a user equipment and a communication network node, which are communicating with each other on uplink and downlink data channels over a radio interface, whereby an available scheduling headroom is distributed by a scheduler between user equipments which are to be scheduled.

According to a first aspect of embodiments of the present invention, this objective is achieved through a method in a communication network node wherein the uplink data rate is controlled by the step of sending a scheduling grant signalling comprising a granted headroom to said user equipment, based on which said user equipment is able to select a transport format combination.

According to a second aspect of embodiments of the present invention, this objective is achieved through a method in a user equipment wherein the uplink data rate is controlled by the steps of receiving a scheduling grant signalling comprising a granted headroom from said communication network node and selecting a transport format combination based on said received scheduling grant.

According to a third aspect of embodiments of the present invention, this objective is achieved through a communication network node wherein the uplink data rate is controlled by a communication network node that comprises a transmitting unit arranged to send a scheduling grant signalling comprising a granted headroom to said user equipment, based on which said user equipment is able to select a transport format combination.

According to a fourth aspect of embodiments of the present invention, this objective is achieved through a user equipment wherein the uplink data rate is controlled by a user equipment that comprises a receiving unit arranged to receive a scheduling grant signalling comprising a granted headroom from said communication network node and a processing unit arranged to select a transport format combination based on said received scheduling grant.

Further embodiments are listed in the dependent claims.

Thanks to the provision of methods and arrangements, which change the scheduling grant to be scheduled power or interference headroom of UE, and move scheduling headroom to E-TFC mapping to UE side, the uplink performance is improved without increasing the system overhead. At the network side the load control & EUL scheduler can be performed at a relatively low rate. At the UE side the scheduling headroom to E-TFC mapping can be performed fairly fast.

Still other objects and features of embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For a better understanding, reference is made to the following drawings and preferred embodiments of the invention. In the drawings, wherein like reference characters denote similar elements throughout the several views.

DETAILED DESCRIPTION

Figure 1:
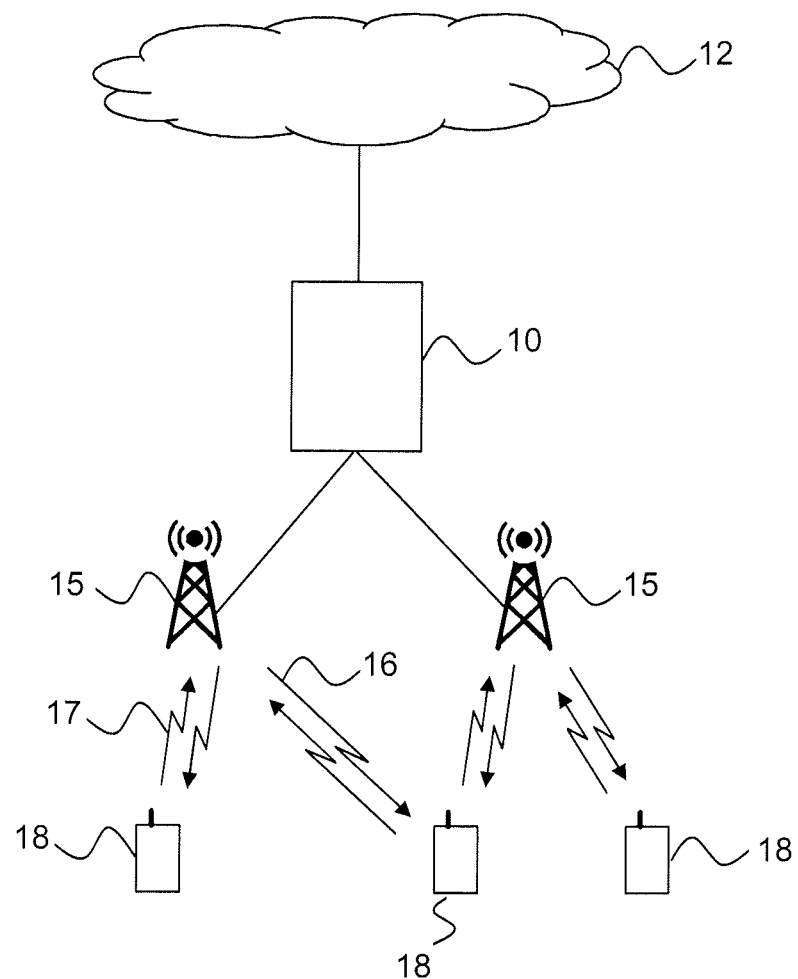
FIG. 1 shows a communication network architecture according to embodiments of the present invention.
Figure 2:
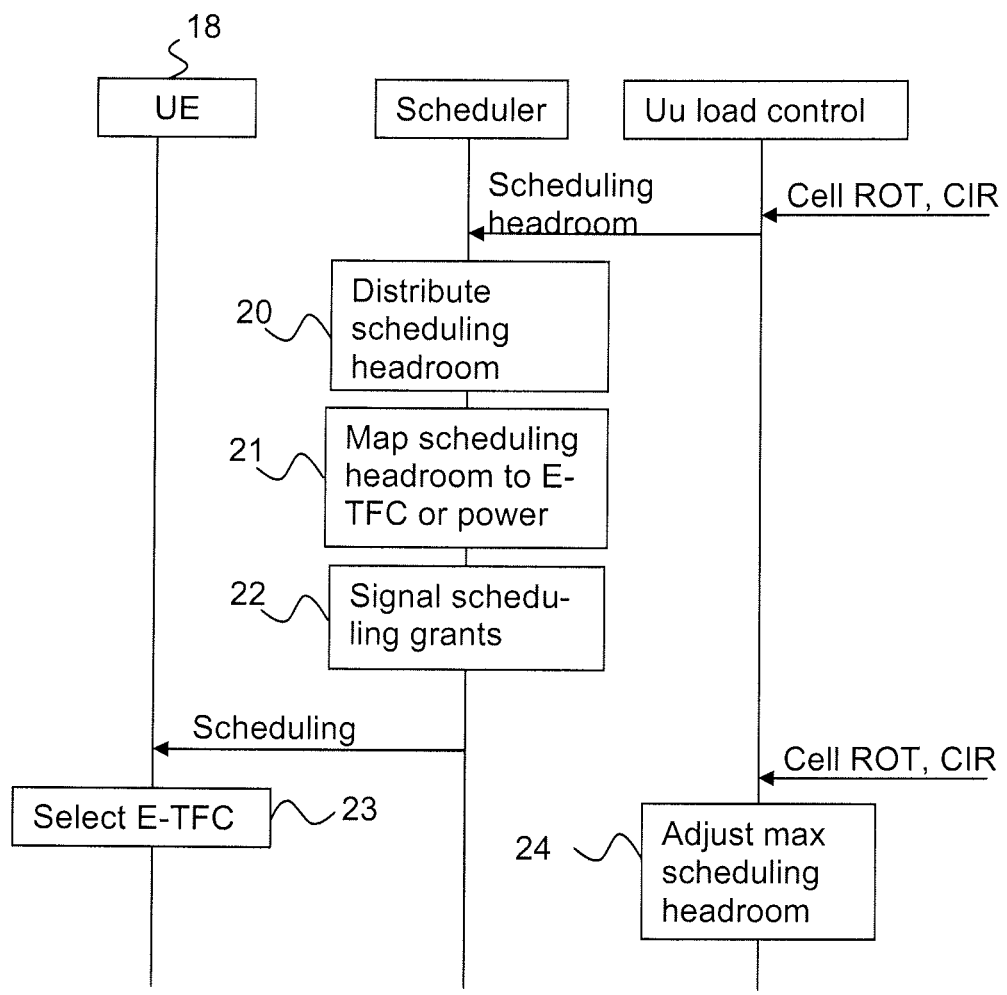
FIG. 2 shows the uplink scheduling in a WCDMA radio network according to prior art.

FIG. 1 depicts a communication system including a radio access network (RAN), such as the UMTS terrestrial radio access network (UTRAN) architecture, comprising at least one radio base station (RBS) (eNode B or Node B) 15 (two are shown in FIG. 1) connected one or more radio network controllers (RNCs) 10. The RAN is connected to a core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and downlink channel denoted 16. On the downlink channel 16, the RBS 15 transmits data to each user equipment 18 at a respective power level. On the uplink channel 17, the user equipments 18 transmit data to the RBS 15 at respective power levels.

According to a preferred embodiment of the present invention, the communication system is herein described as an HSPA communication system. The skilled person, however, realizes that the inventive method and arrangement works very well on other communications systems as well, such as CDMA2000. The user equipments 18 may be mobile stations such as mobile telephones ("cellular" telephones) and laptop computers with mobile termination and thus may be, for example, portable, pocket, hand-held, computer-included, or car-mounted mobile devices which communicate voice and/or data with the RAN.

The core idea of this invention is to change the scheduling grant to be scheduled power or interference headroom of UE, and move the mapping between the headroom and E-TFC to the user equipment side. The invention includes that:

At system side change the scheduling grant to be scheduled headroom for mobile user. The scheduled headroom can be expressed in terms of a portion of rise over thermal; a portion of load factor; and/or an upper limit of power contribution.

Figure 3:
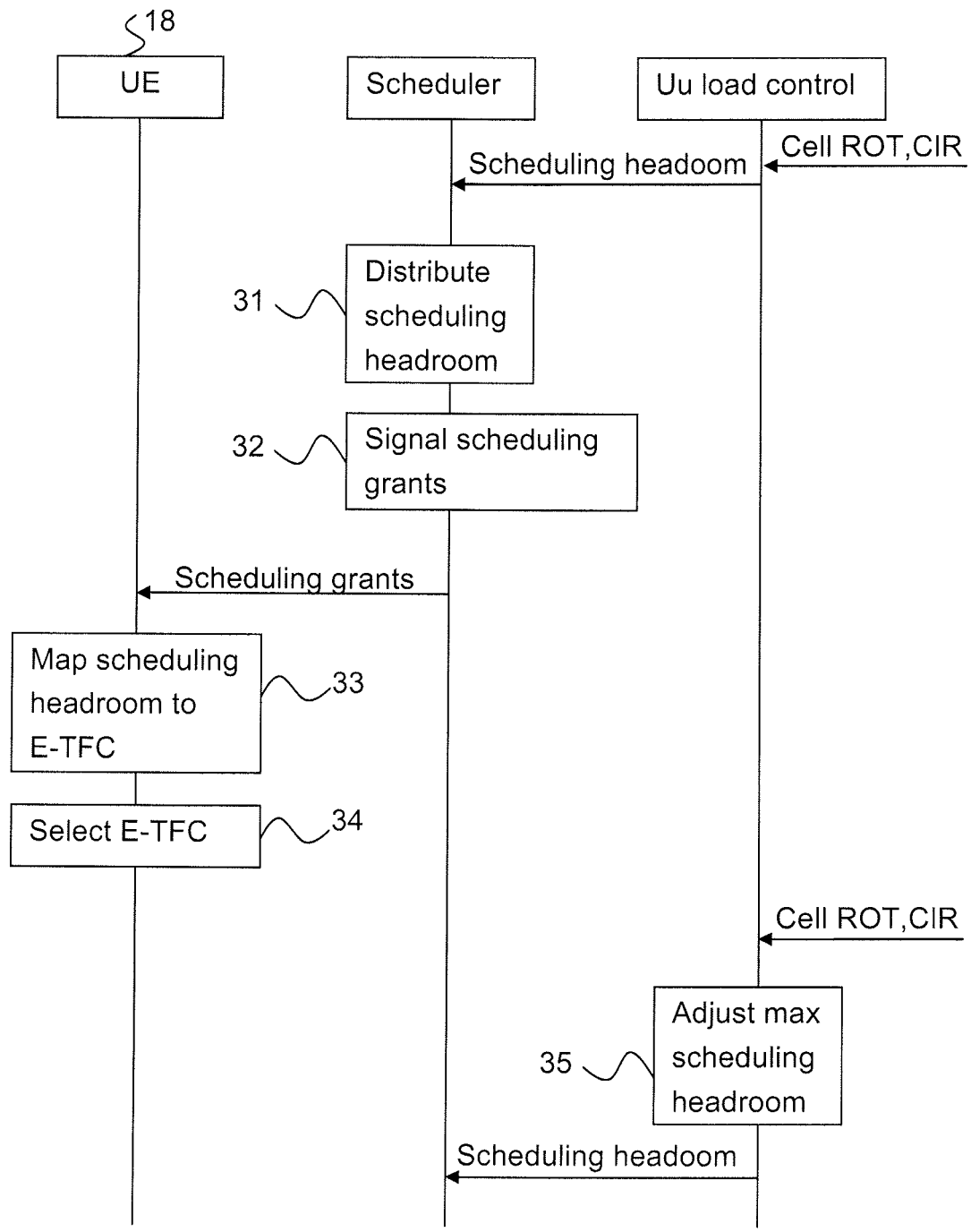
FIG. 3 shows the uplink scheduling according to embodiments of the present invention.

Move the mapping between the scheduled headroom and E-TFC to mobile terminal side. More specifically, the mobile terminal selects a suitable E-TFC based on the granted scheduled headroom; the available transmission power; and/or the status of the transmission buffer This is illustrated in FIG. 3.

Uplink load control provides the EUL scheduler with the total scheduling headroom of a cell;

The EUL scheduler selects the user equipment(s) to be scheduled based on priority queue;

The EUL scheduler distributes the available scheduling headroom among the selected user equipment(s) (step 31). How the scheduling headroom is distributed depends on the scheduling strategy to be used, the simplest example is to be equally distributed;

The EUL scheduler determines the maximum power or interference headroom that each scheduled UE can use and signals to the user equipment via scheduling grant (step 32). This is described in further detail below;

The user equipment maps the scheduling headroom to E-TFC (step 33) and selects a suitable E-TFC based on the granted headroom (step 34), as described further below, the available transmission power and/or the status of transmission buffer;

The RBS measures cell rise over thermal (RoT) and CIR and inputs these measurements to the uplink load control;

The uplink load control adjusts the maximum scheduling headroom based on measurements and provides the EUL scheduler with the total scheduling headroom of a cell and so on.

When comparing embodiments of the present invention with prior arts, the main difference is the scheduling grant. The proposed scheduling grant is power or interference headroom, instead of power offset or E-TFC. To be more explicit, the follow alternatives may be considered as the scheduling grant:

An upper limit of (averaged) UE receive (Rx) power contribution;

An upper limit of UE transmit (Tx) power contribution. This can be obtained by:

First obtain the upper limit of UE averaged Rx power;

Then estimate the average uplink pathgain at RBS based on e.g. downlink common pilot channel (CPICH) received signal code power (RSCP) measurement reported from UE. The uplink pathgain may be different to downlink pathgain even in average sense due to e.g. different cable loss and TMA gain in the two links. These differences can be taken into account during the pathgain estimation at RBS. There are also other methods to improve this estimation accuracy.

The upper limit of Tx power contribution can then be obtained based on the above two, optionally also the maximum UE Tx power.

A portion of (averaged) rise over thermal, i.e. the total interference relative to thermal noise.

The proposed scheduling grant directly reflects to what extent the radio resource is utilized, and thus provides the possibility to more effectively keep the radio resource usage at the desired level. Moreover, by controlling only the average resource usage the uplink load control and EUL scheduling may be performed at a relatively slow rate and system delay is not a critical issue.

Another difference between embodiments of the present invention and prior art, is that the mapping between the scheduling headroom and E-TFC is moved from the network system side to the user equipment side. The existing E-TFC selection algorithm is modified to take the granted headroom into consideration, which is further described below.

With Tx power based scheduling grant

The EUL scheduler determines for each scheduled UE an upper limit of Tx power contribution, denoted as $T_{max}$ UE limits its maximum total Tx power ($P_{total}$) as:

$$P_{total} = \min(T_{max}, P_{max}) \tag{4}$$

Where $P_{max}$ is the maximum total UE Tx power, it can also be directly taken into account in determining $T_{max}$.

The total UE Tx power relates to DPCCH Tx power as:

$$P_{total} = P_{DPCCH} \cdot (1 + \Delta_{E\text{-}DPDCH} + \Delta_{E\text{-}DPCCH}) \tag{5}$$

Where PDPCCH is DPCCH Tx power, $\Delta_{E\text{-}DPDCH}$ is E-DPDCH to DPCCH power offset, $\Delta_{E\text{-}DPDCH}$ is E-DPCCH to DPCCH power offset.

According to Equation. (4) and (5), UE may determine the maximum supportable E-DPDCH to DPCCH power offset ($\Delta_{E\text{-}DPDCH}^{max}$) as:

$$\Delta_{E\text{-}DPDCH}^{max} = \min(T_{max}, P_{max})/P_{DPCCH} - \Delta_{E\text{-}DPCCH} - 1 \tag{6}$$

UE determines the E-TFC to adopt based on $\Delta_{E\text{-}DPDCH}^{max}$ and status of UE Tx buffer.

With (averaged) Rx power based scheduling grant

The EUL scheduler determines for each scheduled UE an upper limit of (averaged) Rx power contribution, denoted as $R_{max}$.

UE limits its maximum total Tx power ($P_{total}$) as:

$$P_{total} = \min(R_{max}/g_s, P_{max}) \tag{7}$$

Where $g_s$ is the average uplink pathgain estimated by UE, which may be based on e.g. common pilot channel (CPICH) received signal code power (RSCP) measurements.

UE determines the maximum supportable E-DPDCH to DPCCH power offset ($\Delta_{E\text{-}DPDCH}^{max}$) as:

$$\Delta_{E\text{-}DPDCH}{}^{max} = \min(R_{max}, g_s, P_{max})/P_{DPCCH} - \Delta_{E\text{-}DPCCH} - 1 \qquad (8)$$

UE determines the E-TFC to adopt based on $\Delta_{E\text{-}DPDCH}{}^{max}$ and status of UE Tx buffer.

The power based load estimation is adopted in the scheduling headroom to E-TFC mapping which makes load estimation more accurate at the time the maximum supportable E-DPDCH to DPCCH power offset and the E-TFC to adopt are determined. Besides, at UE side the scheduling headroom to E-TFC mapping may be made fairly fast (every 2 ms TTI) with minor delay since the maximum supportable E-DPDCH to DPCCH power offset is determined by the UE itself and no signaling process is involved. This evidently decreases the load estimation error at the time the UE transmits with the selected E-TFC. Thus, the uplink performance is evidently improved.

Figure 4:
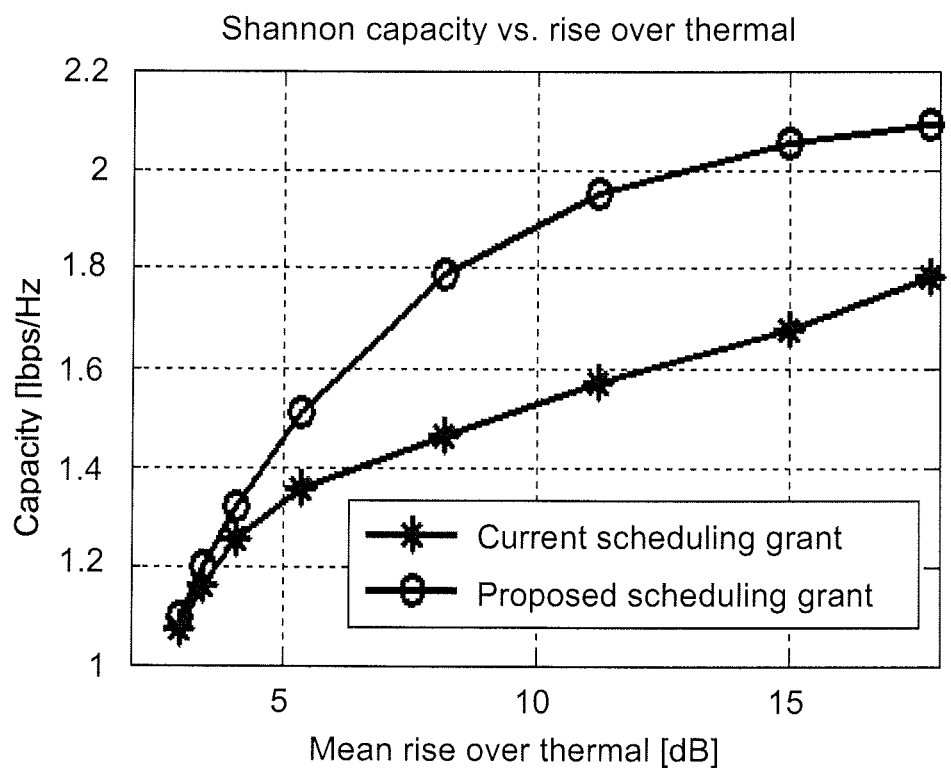
FIG. 4 is a diagram that shows a comparison of the system performance, Shannon capacity vs. ROT, according to prior art and embodiments of the present invention.
Figure 5:
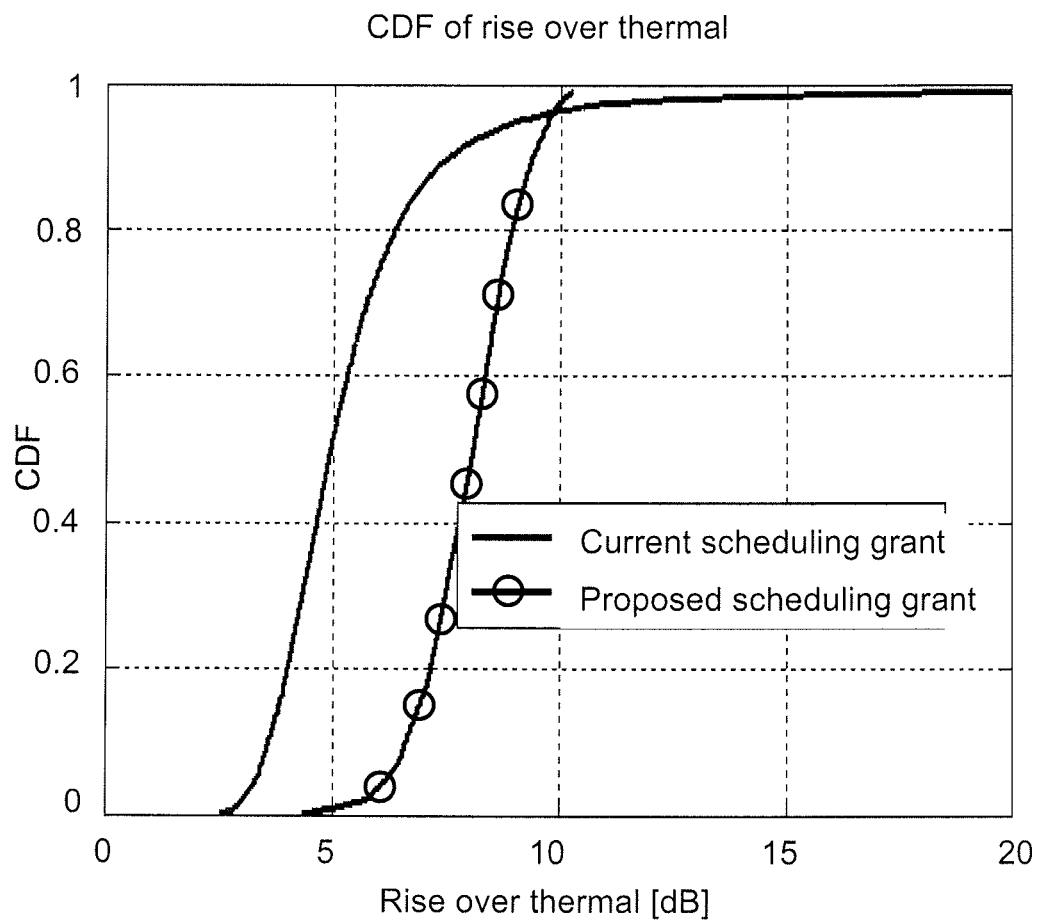
FIG. 5 is a diagram that shows a comparison of the system performance, ROT distribution, according to prior art and embodiments of the present invention.

FIGS. 4 and 5 show comparisons of the system performance with the solution according to embodiments of the present invention and the prior art solution. FIG. 4 shows the Shannon capacity at different level of mean rise over thermal and FIG. 5 shows the rise over thermal distribution at a certain mean rise over thermal.

It is shown clearly in the diagrams that the proposed solution increases the uplink capacity (FIG. 4) and decrease RoT oscillation (FIG. 5) at the same level of radio resource consumption. Moreover, the variation of the rise over thermal is much smaller with the proposed solution than with the prior art solution. Furthermore, the proposed solution is able to avoid abnormal spikes in rise over thermal, i.e. very high rise over thermal peaks.

Figure 6:
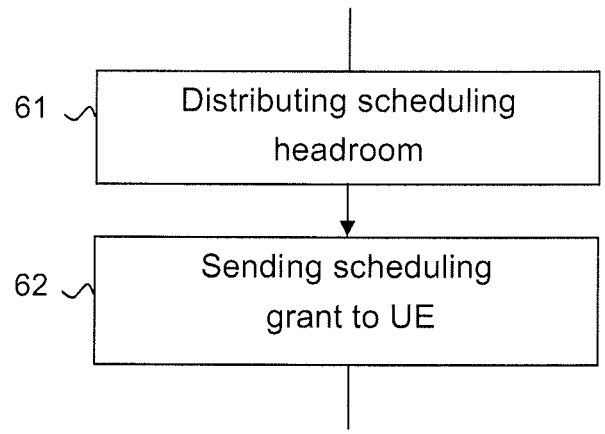
FIG. 6 is a flowchart showing the inventive method steps in a communication network node.

According to a general embodiment of the present invention a procedure in a communication network node of controlling an uplink data rate between a user equipment and said communication network node, which are communicating with each other on uplink and downlink data channels over a radio interface, as shown in FIG. 6, is provided. The procedure comprises the steps of:
 distributing an available scheduling headroom, provided by an uplink load control unit, between user equipments which are to be scheduled (step 61);
 sending a scheduling grant signalling comprising a granted headroom (scheduled headroom) to said user equipment, based on which said user equipment is able to select a transport format combination (step 62).

According to some embodiments, said scheduling grant is an upper limit of a receive power contribution of said user equipment.

According to some embodiments, said scheduling grant is an upper limit of a transmit power contribution of said user equipment determined by the steps of:
 obtaining an upper limit of a receive power contribution of said user equipment;
 estimating an average uplink pathgain based on a measurement report sent from said user equipment
 determining said upper limit of a transmit power contribution based on said obtained upper limit of a receive power contribution and said estimated average uplink pathgain.

According to some embodiments, said scheduling grant is a portion of rise over thermal.

According to some embodiments, said step of distributing an available scheduling headroom between user equipments comprises the step of distributing the available scheduling headroom equally between said user equipments.

Figure 7:
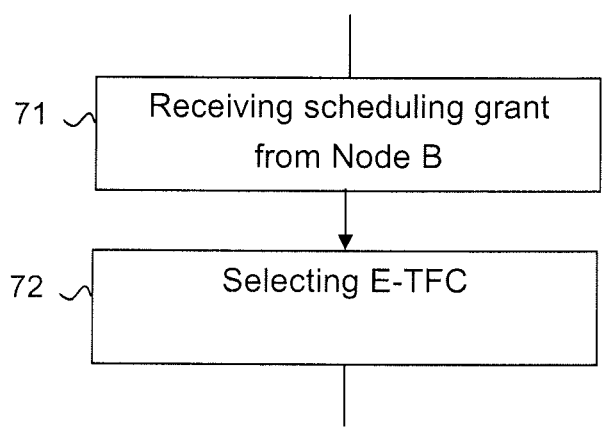
FIG. 7 is a flowchart showing the inventive method steps in a user equipment.

According to a general embodiment of the present invention a procedure in a user equipment of controlling an uplink data rate between a user equipment and said communication network node, which are communicating with each other on uplink and downlink data channels over a radio interface, as shown in FIG. 7, is provided. The procedure comprises the steps of:
 receiving a scheduling grant signalling comprising a granted headroom (or scheduled headroom) from said communication network node, which has distributed an available scheduling headroom between user equipments that are to be scheduled (step 71);
 selecting a transport format combination based on said received scheduling grant (step 72).

According to some embodiments, said step of selecting a transport format combination with a transmit power based scheduling grant, further comprises the steps of:
 limiting a maximum total transmit power based on an upper limit of transmit power contribution determined by said communication network node;
 determining a maximum power offset; and,
 determining said transport format combination based on said determined maximum power offset and based on a status of a transmit buffer.

According to some embodiments, said step of selecting a transport format combination with a received power based scheduling grant, further comprises the steps of:
 limiting a maximum total transmit power, based on an upper limit of receive power contribution determined by said communication network node;
 determining a maximum power offset; and,
 determining said transport format combination based on said determined maximum power offset and based on a status of a transmit buffer.

Figure 8:
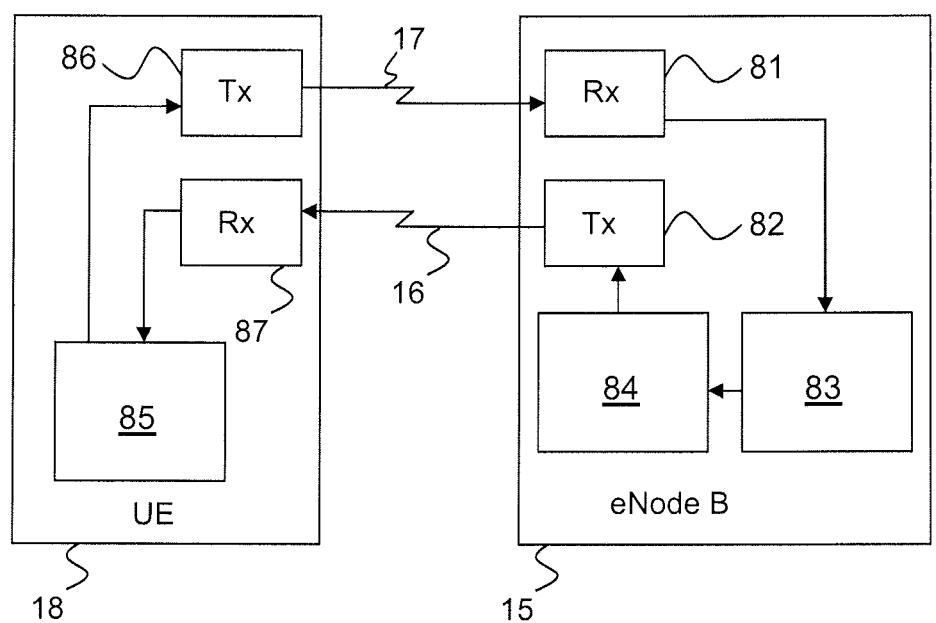
FIG. 8 is a simplified block diagram over a user equipment and a communication network node.

FIG. 8 is a block diagram showing a user equipment 18 and a communication network node 15, such as Node B of controlling an uplink data rate between the user equipment 18 and said communication network node 15, which are communicating with each other on uplink 17 and downlink 16 data channels over a radio interface.

The Node B 15 comprises a transmitting unit 82 including a radio transmitter. The Node B 15 further comprises a receiving unit 81 including a receiver. The transmitter 82 is transmitting data to a receiver 87 of the user equipment 18 over a radio interface on the downlink channel 16. The receiver 81 is receiving data from the user equipment 18 on the uplink channel 17. Node B 15 further comprises an uplink load control unit 83 arranged to provide a scheduler 84, also comprised in Node B 15, with a total scheduling headroom of a cell. The scheduler 84 is arranged to distribute the available scheduling headroom between user equipments 18 which are to be scheduled. The transmitting unit 82 is arranged to send a scheduling grant signalling comprising a granted headroom to said user equipment 18, based on which said user equipment 18 is able to select a transport format combination.

According to some embodiments, said scheduling grant is an upper limit of a receive power contribution of said user equipment 18.

According to some embodiments, said scheduler 84 is further arranged to determine said scheduling grant being an upper limit of a transmit power contribution of said user equipment 18 by performing the steps of:
 obtaining an upper limit of a receive power contribution of said user equipment;
 estimating an average uplink pathgain based on a measurement report sent from said user equipment determining said upper limit of a transmit power contribution based on said obtained upper limit of a receive power contribution and said estimated average uplink pathgain.

According to some embodiments, said scheduling grant is a portion of rise over thermal.

According to some embodiments, said scheduler 84 is arranged to distribute the available scheduling headroom equally between said user equipments 18.

The user equipment 18 comprises a transmitting unit 86 including a radio transmitter. The radio transmitter 86 is arranged to transmit data packets to the receiver 81 of the Node B 15 over the radio interface on the uplink channel 17. The UE 18 further comprises a receiving unit 87 including a receiver. The receiver 87 is arranged to receive data packets transmitted from the transmitter 82 of the Node B 15 on the downlink channel 16. The receiving unit 87 is further arranged to receive a scheduling grant signalling comprising a granted headroom from said communication network node. The UE 18 further comprises a processing unit 85 arranged to select a transport format combination based on said received scheduling grant.

According to some embodiments, said processing unit 85 is arranged to select a transport format combination with a transmit power based scheduling grant, by performing the steps of:
limiting a maximum total transmit power based on an upper limit of transmit power contribution determined by said communication network node;
determining a maximum power offset; and,
determining said transport format combination based on said determined maximum power offset and based on a status of a transmit buffer.

According to some embodiments, said processing unit 85 is arranged to select a transport format combination with a received power based scheduling grant, by performing the steps of:
limiting a maximum total transmit power, based on an upper limit of receive power contribution determined by said communication network node;
determining a maximum power offset; and,
determining said transport format combination based on said determined maximum power offset and based on a status of a transmit buffer.

As has been described above, the embodiments of the present invention is advantageous over prior art. Some of these advantages are that load estimation error due to either inaccurate load estimation during the EUL scheduler procedure or large system delay in scheduling headroom to E-TFC mapping is avoided; the need to have fast load control and scheduler operation at system side is mitigated; there is no increase in signalling overhead; increased throughput (with fast E-TFC selection at UE side) is obtained; decreased rise over thermal oscillation and less high rise over thermal peaks are obtained; and, it is easy to implement in existing systems.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim embodiments of the present invention are intended to be construed in a non-exclusive manner, namely allowing for items, components or elements not explicitly described also to be present. Reference to the singular is also to be construed to relate to the plural and vice versa.

The invention claimed is:

1. A method in a communication network node of controlling an uplink data rate between a user equipment and said communication network node, which are communicating with each other on uplink and downlink data channels over a radio interface, whereby an available scheduling headroom is distributed by a scheduler among user equipments that are to be scheduled, wherein said available scheduling headroom is the total amount of uplink radio resources that a plurality of user equipments that are to be scheduled may use, said method comprising:
sending, to said user equipment, a user-equipment-specific scheduling grant signaling, said user-equipment-specific scheduling grant signaling comprising a granted headroom defining a total headroom said user equipment can use for uplink transmission, wherein said granted headroom represents a portion of said available scheduling headroom, based on which said user equipment is able to select a transport format combination for a subsequent uplink transmission,
wherein said granted headroom is an upper limit of a receive power contribution at said communication network node of said user equipment.

2. A method in a communication network node of controlling an uplink data rate between a user equipment and said communication network node, which are communicating with each other on uplink and downlink data channels over a radio interface, whereby an available scheduling headroom is distributed by a scheduler among user equipments that are to be scheduled, wherein said available scheduling headroom is the total amount of uplink radio resources that a plurality of user equipments that are to be scheduled may use, said method comprising:
sending, to said user equipment, a user-equipment-specific scheduling grant signaling, said user-equipment-specific scheduling grant signaling comprising a granted headroom defining a total headroom said user equipment can use for uplink transmission, wherein said granted headroom represents a portion of said available scheduling headroom, based on which said user equipment is able to select a transport format combination for a subsequent uplink transmission,
wherein said granted headroom is an upper limit of a transmit power contribution of said user equipment determined by:
obtaining an upper limit of a receive power contribution at said communication network node of said user equipment;
estimating an average uplink path-gain based on a measurement report sent from said user equipment;
determining said upper limit of a transmit power contribution at said user equipment based on said obtained upper limit of a receive power contribution and said estimated average uplink path-gain.

3. A method in a user equipment of controlling an uplink data rate between said user equipment and a communication network node, which are communicating with each other on uplink and downlink data channels over a radio interface, whereby an available scheduling headroom is distributed by a scheduler among user equipments that are to be scheduled, wherein said available scheduling headroom is the total amount of uplink radio resources that a plurality of user equipments that are to be scheduled may use, said method comprising:
- receiving, from said communication network node, a user-equipment-specific scheduling grant signaling, said user-equipment-specific scheduling grant signaling comprising a granted headroom defining a total headroom said user equipment can use for uplink transmission, wherein said granted headroom represents a portion of said available scheduling headroom;
- selecting a transport format combination for a subsequent transmission, based on said received granted headroom; and
- transmitting data to the communication network node using the selected transport format combination, wherein selecting a transport format combination further comprises:
- limiting a maximum total transmit power based on an upper limit of transmit power contribution at said user equipment determined by said communication network node;
- determining a maximum power offset; and,
- determining said transport format combination based on said determined maximum power offset and based on a status of a transmit buffer.

4. A method in a user equipment of controlling an uplink data rate between said user equipment and a communication network node, which are communicating with each other on uplink and downlink data channels over a radio interface, whereby an available scheduling headroom is distributed by a scheduler among user equipments that are to be scheduled, wherein said available scheduling headroom is the total amount of uplink radio resources that a plurality of user equipments that are to be scheduled may use, said method comprising:
- receiving, from said communication network node, a user-equipment-specific scheduling grant signaling, said user-equipment-specific scheduling grant signaling comprising a granted headroom defining a total headroom said user equipment can use for uplink transmission, wherein said granted headroom represents a portion of said available scheduling headroom;
- selecting a transport format combination for a subsequent transmission, based on said received granted headroom; and
- transmitting data to the communication network node using the selected transport format combination, wherein selecting a transport format combination further comprises:
- limiting a maximum total transmit power, based on an upper limit of receive power contribution at said communication network node determined by said communication network node;
- determining a maximum power offset; and
- determining said transport format combination based on said determined maximum power offset and based on a status of a transmit buffer.

5. A communication network node arranged to control an uplink data rate between a user equipment and said communication network node, which are communicating with each other on uplink and downlink data channels over a radio interface, the communication network node comprising:
- a scheduler arranged to distribute available scheduling headroom among user equipments that are to be scheduled, wherein said available scheduling headroom is the total amount of uplink radio resources that a plurality of user equipments that are to be scheduled may use; and
- a transmitter arranged to send, to said user equipment, a user-equipment-specific scheduling grant signaling comprising a granted headroom defining a total headroom said user equipment can use for uplink transmission, wherein said granted headroom represents a portion of said available scheduling headroom, based on which granted headroom said user equipment is able to select a transport format combination for a subsequent uplink transmission, wherein said granted headroom is an upper limit of a receive power contribution at said communication network node of said user equipment.

6. A communication network node arranged to control an uplink data rate between a user equipment and said communication network node, which are communicating with each other on uplink and downlink data channels over a radio interface, the communication network node comprising:
- a scheduler arranged to distribute available scheduling headroom among user equipments that are to be scheduled, wherein said available scheduling headroom is the total amount of uplink radio resources that a plurality of user equipments that are to be scheduled may use; and
- a transmitter arranged to send, to said user equipment, a user-equipment-specific scheduling grant signaling comprising a granted headroom defining a total headroom said user equipment can use for uplink transmission, wherein said granted headroom represents a portion of said available scheduling headroom, based on which granted headroom said user equipment is able to select a transport format combination for a subsequent uplink transmission, wherein said scheduler is further arranged to determine said granted headroom being an upper limit of a transmit power contribution of said user equipment by performing the steps of:
- obtaining an upper limit of a receive power contribution at said communication network node of said user equipment;
- estimating an average uplink path-gain based on a measurement report sent from said user equipment; and
- determining said upper limit of a transmit power contribution at said user equipment based on said obtained upper limit of a receive power contribution and said estimated average uplink path-gain.

7. A user equipment arranged to control an uplink data rate between said user equipment and a communication network node, which are communicating with each other on uplink and downlink data channels over a radio interface, whereby an available scheduling headroom is distributed by a scheduler among user equipments that are to be scheduled, wherein said available scheduling headroom is the total amount of uplink radio resources that a plurality of user equipments that are to be scheduled may use, wherein the user equipment comprises:
- a receiver arranged to receive, from said communication network node, a user-equipment-specific scheduling grant signaling comprising a granted headroom defining a total headroom said user equipment can use for uplink transmission, wherein said granted headroom represents a portion of said available scheduling headroom;

a processing circuit arranged to select a transport format combination for a subsequent transmission, based on said received granted headroom; and a transmitter arranged to transmit data to the communication network node using the selected transport format combination, wherein said processing circuit is arranged to select a transport format combination with a transmit power based scheduling grant, by performing the steps of:

limiting a maximum total transmit power based on an upper limit of transmit power contribution at said user equipment determined by said communication network node;

determining a maximum power offset; and, determining said transport format combination based on said determined maximum power offset and based on a status of a transmit buffer.

8. A user equipment arranged to control an uplink data rate between said user equipment and a communication network node, which are communicating with each other on uplink and downlink data channels over a radio interface, whereby an available scheduling headroom is distributed by a scheduler among user equipments that are to be scheduled, wherein said available scheduling headroom is the total amount of uplink radio resources that a plurality of user equipments that are to be scheduled may use, wherein the user equipment comprises:

a receiver arranged to receive, from said communication network node, a user-equipment-specific scheduling grant signaling comprising a granted headroom defining a total headroom said user equipment can use for uplink transmission, wherein said granted headroom represents a portion of said available scheduling headroom;

a processing circuit arranged to select a transport format combination for a subsequent transmission, based on said received granted headroom, and a transmitter arranged to transmit data to the communication network node using the selected transport format combination, wherein said processing circuit is arranged to select a transport format combination with a received power based scheduling grant, by:

limiting a maximum total transmit power, based on an upper limit of receive power contribution at said communication network node determined by said communication network node;

determining a maximum power offset; and, determining said transport format combination based on said determined maximum power offset and based on a status of a transmit buffer.

\* \* \* \* \*

UNITED STATES PATENT AND TRADEMARK OFFICE
CERTIFICATE OF CORRECTION

PATENT NO. : 9,277,510 B2
APPLICATION NO. : 13/501783
DATED : March 1, 2016
INVENTOR(S) : Wang Helmersson et al.

Page 1 of 1

It is certified that error appears in the above-identified patent and that said Letters Patent is hereby corrected as shown below:

In the specification

In Column 2, Line 57, delete "thermal;" and insert -- thermal. --, therefor.

In Column 4, Line 52, delete "method steps" and insert -- steps --, therefor.

In Column 4, Line 54, delete "method steps" and insert -- steps --, therefor.

In Column 4, Line 65, delete "one" and insert -- to one --, therefor.

In Column 6, Line 46, delete "$\Delta_{E\text{-}DPDCH}$" and insert -- $\Delta_{E\text{-}DPCCH}$ --, therefor.

In Column 7, Line 1, delete "$(R_{max}, g_s, P_{max})/P_{DPCCH}\text{-}$" and insert -- $(R_{max}/g_s, P_{max})/P_{DPCCH}\text{-}$ --, therefor.

In Column 7, Line 55, delete "equipment" and insert -- equipment; --, therefor.

In Column 8, Line 67, delete "equipment" and insert -- equipment; --, therefor.

Signed and Sealed this
Sixteenth Day of August, 2016

Michelle K. Lee
*Director of the United States Patent and Trademark Office*